United States Patent
Hikichi et al.

(10) Patent No.: US 6,850,666 B2
(45) Date of Patent: Feb. 1, 2005

(54) OPTICAL MODULE

(75) Inventors: Naoko Hikichi, Osaka (JP); Kenichi Nakama, Osaka (JP); Fumitoshi Kobayashi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 43 days.

(21) Appl. No.: 10/437,392

(22) Filed: May 14, 2003

(65) Prior Publication Data

US 2003/0231830 A1 Dec. 18, 2003

(30) Foreign Application Priority Data

May 14, 2002 (JP) .................................... P2002-139110

(51) Int. Cl.$^7$ ................................................ G02B 6/26
(52) U.S. Cl. ...................................................... 385/31
(58) Field of Search ............................. 385/31, 33–36

(56) References Cited

U.S. PATENT DOCUMENTS

| | | | | |
|---|---|---|---|---|
| 4,266,534 A | * | 5/1981 | Ogawa | 600/177 |
| 4,929,070 A | * | 5/1990 | Yokota et al. | 600/177 |
| 5,559,911 A | * | 9/1996 | Forkner et al. | 385/33 |
| 6,694,074 B2 | * | 2/2004 | Schunk | 385/33 |
| 6,718,091 B2 | * | 4/2004 | Ishihara et al. | 385/36 |

* cited by examiner

*Primary Examiner*—Akm Enayet Ullah
*Assistant Examiner*—Jerry T Rahll
(74) *Attorney, Agent, or Firm*—Whitman, Curtis & Christofferson, PC

(57) ABSTRACT

An optical module according to the invention includes an optical fiber, a planar lens, and a flat plate-like transparent member for optically coupling the optical fiber and the planar lens to each other. The transparent member has a nearly spherical concave portion formed in a surface of the transparent member. An end surface of the optical fiber is inserted into the concave portion of the transparent member so as to abut thereon and bonded and fixed thereinto. Further, a surface of the transparent member opposite to the surface in which the concave portion is formed is joined to a surface of the planar lens to make an optical axis of the optical fiber coincident with an optical axis of the planar lens. The concave portion is filled with a filler material having a refractive index higher than that of the transparent member to thereby fix the optical fiber.

17 Claims, 5 Drawing Sheets

OPTICAL MODULE

The present application is based on Japanese Patent Application No. 2002-139110, the entire contents of which are incorporated herein by reference.

BACKGROUND OF THE INVENTION

1. Field of the Invention

The present invention relates to an optical module and particularly to an optical module having a function for optically coupling an optical fiber and a lens to each other.

2. Related Art

In optical communication using optical fiber, transmission capacity thereof has increased rapidly in recent years. For example, in a relay station, use of a large number of optical fibers in parallel to one another has become frequent with the advance of laying of optical fiber close to users such as business users and home users. Because it is necessary to insert various optical elements in transmission paths based on these optical fibers, it is necessary to couple the large number of optical fibers to the optical elements collectively. Generally, a lens is used so that light output from each optical fiber is made incident onto a corresponding optical element efficiently or, conversely, light output from each optical element is made incident onto a corresponding optical fiber efficiently.

Particularly when such a large number of optical fibers as described above are to be coupled, provision of coupling portions as a module is preferable for miniaturization of the device and improvement of reliability. An optical module using a planar microlens array having a plurality of very small lenses (microlenses) formed on a flatplate-like transparent substrate has been developed for this purpose. Use of such an optical module permits the large number of optical fibers to be efficiently coupled to the optical elements.

Incidentally, the numerical aperture (NA) of a silica-based single mode optical fiber is about 0.1 in air on the assumption that the refractive index difference between a core and a clad is from 0.2% to 0.3%. When a spacer made of a material (such as glass) having a refractive index higher than that of air is inserted between a lens and an optical fiber, the NA with respect to light output from the optical fiber is reduced. When, for example, the spacer is made of glass having a refractive index n=1.46, the NA is reduced to about 0.069.

Generally, if a silica-based single mode optical fiber 10 is provided so as to be far by a certain distance or longer from a lens 22 when light 16 output from the optical fiber 10 is to be coupled to the lens 22 or lens array as shown in FIG. 7A, a part 18 of the light 16 output from the optical fiber 10 is left (kicked) out of the lens area as shown in FIG. 7B. As a result, there arises a problem that coupling loss increases.

Generally, because the effective area of a lens is a center portion which is 90% as large as the total area of the lens, light incident onto the other area of the lens is kicked out so that coupling efficiency is worsened. Furthermore, in the case of a lens array having lens elements arranged closely as shown in FIGS. 7A and 7B, the light kicked out is input into adjacent lenses to bring deterioration of crosstalk as well as the light is kicked out. Accordingly, in order to keep coupling efficiency and crosstalk to a certain degree or higher, the optical fiber-lens distance must be reduced to be not larger than a certain value or a lens having a large diameter must be used. As a result, there arises a problem that a limit occurs in optical design because the optical fiber-lens distance is limited or that the optical module is large-sized because a lens having such a large diameter is used.

Processing a tip of each optical fiber into a hemispherical tip by electric discharge machining, polishing, etching or the like is known as a method for improving such optical fiber-lens coupling efficiency. The tip of the optical fiber is processed to have a lens function to suppress spread of output light to thereby reduce both kicking-out of light and closstalk. The degree of freedom for the obtained lens effect is however small because this processing is provided for deforming the shape of the tip of the optical fiber. Furthermore, complex steps are required to cause more labor and cost because the hemispherically ending process must be added.

SUMMARY OF THE INVENTION

The invention is developed to solve the problem and an object of the invention is to provide an optical module which makes optical fiber-lens coupling easy to thereby reduce coupling loss. Another object of the invention is to provide an optical module by which a plurality of optical fibers are coupled to lenses respectively with little interchannel crosstalk though the optical module is small-sized.

The optical module according to the invention is an optical module which has a function for optically coupling an optical fiber and a planar lens to each other and which is configured as follows. That is, a transparent member has a nearly spherical concave portion formed in its one surface and an end surface of the optical fiber is inserted into the nearly spherical concave portion of the transparent member so as to abut thereon and bonded and fixed thereinto. Further, a surface of the transparent member opposite to the surface in which the nearly spherical concave portion is formed is joined to a surface of the planar lens to make an optical axis of the optical fiber coincident with an optical axis of the planar lens.

When a plurality of optical fibers are to be optically coupled to a planar lens array having lens elements arranged, the transparent member has a plurality of nearly spherical concave portions formed in its one surface so that the arrangement of the nearly spherical concave portions is coincident with the arrangement of the lens elements in the planar lens array. End portions of the optical fibers are inserted into the nearly spherical concave portions of the transparent member so as to abut thereon and bonded and fixed thereinto respectively. Further, a surface of the transparent member opposite to the surface in which the concave portions are formed is joined to a surface of the planar lens array to make optical axes of the optical fibers coincident with optical axes of the lens elements of the planar lens array respectively.

By this configuration, the optical fiber or optical fibers can be coupled to the lens or lens array easily without application of complex processing to an end surface of each optical fiber. Furthermore, because the thickness of the transparent member can be selected optionally, the degree of freedom for designing an optical system is improved so that an optical module having wide applicability can be provided.

Incidentally, each optical fiber may be processed so that a tip portion of a core of the optical fiber is protruded from a clad of the optical fiber. Accordingly, reflection at the tip portion of the optical fiber can be suppressed, so that this processing is effective in attenuating reflected return light.

Preferably, each nearly spherical concave portion formed in the transparent member is filled with a material having a refractive index higher than that of the transparent member to thereby fix the optical fiber. Further preferably, the difference between the refractive index of the filler material provided in each concave portion and the refractive index of the transparent member is in a range of from 0.15 to 0.35 at a wavelength used.

By this condition, the same lens effect as obtained by the hemispherically ending process can be substantially provided without actually processing of the tip of the optical fiber.

Further preferably, the ratio of the curvature radius of a concave portion as a portion closed by each optical fiber abutting on the concave portion to the diameter of the optical fiber is in a range of from 0.5 to 0.7.

By this condition, the same effect as obtained in the case where a lens is formed at the tip of the optical fiber can be provided so that the numerical aperture of the tip of the optical fiber is reduced. Accordingly, optical fiber-lens coupling efficiency is improved, so that crosstalk to adjacent lenses can be suppressed when a lens array is formed.

Further preferably, the minimum distance between optical axes of adjacent ones of the lens elements is in a range of from 50 μm to 125 μm.

The configuration of the invention is largely effective in reducing the size of the optical module because a process of reducing the diameter of each optical fiber is applied so that crosstalk is not increased even in the case where the distance between adjacent lenses is reduced.

DETAILED DESCRIPTION OF THE PREFERRED EMBODIMENTS

Figure 1:
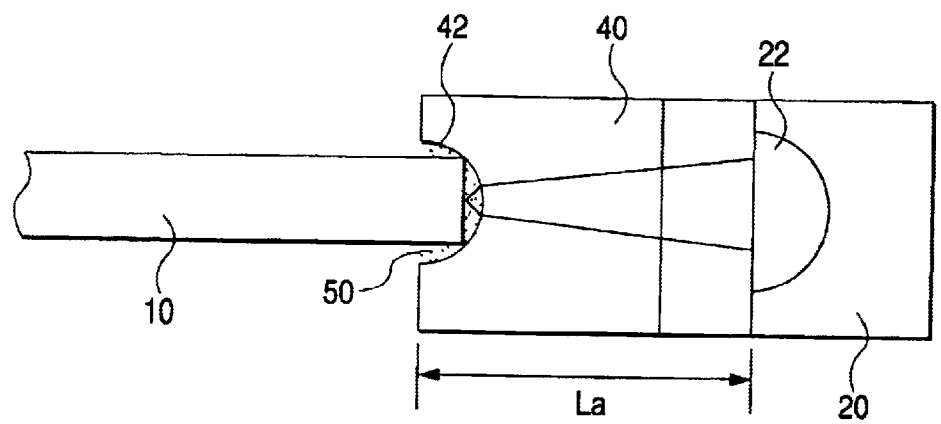
FIG. 1 is a typical view showing an embodiment of an optical module according to the invention.

In an optical module according to the invention, as shown in FIG. 1, a tip of an optical fiber 10 is made to abut on a flat plate-like transparent member 40 having a concave portion 42 so that the optical fiber 10 is positioned. Further, the concave portion 42 is filled with a high-refractive-index material 50 to thereby obtain the same effect as obtained when the tip of the optical fiber is hemispherically ended. As a result, the NA with respect to light output from the optical fiber can be reduced. Accordingly, the degree of freedom for optical design mainly with respect to the distance La between the optical fiber 10 and a lens 22, that is, the conjugate rate, so that optical fiber-lens coupling efficiency can be improved. In addition, in an array type optical module for performing optical fiber array-lens array coupling, crosstalk can be improved.

The optical module according to the invention includes the following members:

a planar microlens or microlens array;

a flat plate-like transparent member having a concave portion or concave portions arranged as an array;

a filler material having a high refractive index; and an optical fiber or optical fiber array.

First, an embodiment of an optical module according to the invention will be described along its production procedure.

A mask having an opening with a diameter of 5 μm was made of a photo resist or the like on a quartz glass substrate. The quartz glass substrate was etched with 49% hydrofluoric acid for 40 minutes. By the etching, a spherical concave portion having a curvature radius of 65 μm was obtained in a surface of the quartz glass substrate. After the mask was removed, a silica-based single mode optical fiber having a diameter of 125 μm was made to abut on the concave portion. Then, the concave portion was filled with an optical adhesive agent having a refractive index of 1.71 so that the optical fiber was bonded and fixed into the concave portion by the adhesive agent. As a result, a lens effect was added to the optical fiber, so that the NA with respect to light output from the optical fiber was reduced to 0.056.

The flat plate-like transparent member 40 and the planar lens substrate 20 were stuck to each other so that the optical axis of the optical fiber 10 fixed in the aforementioned manner was made coincident with the optical axis of the lens 22. In this manner, the optical module according to the invention was completed.

Figure 8A:
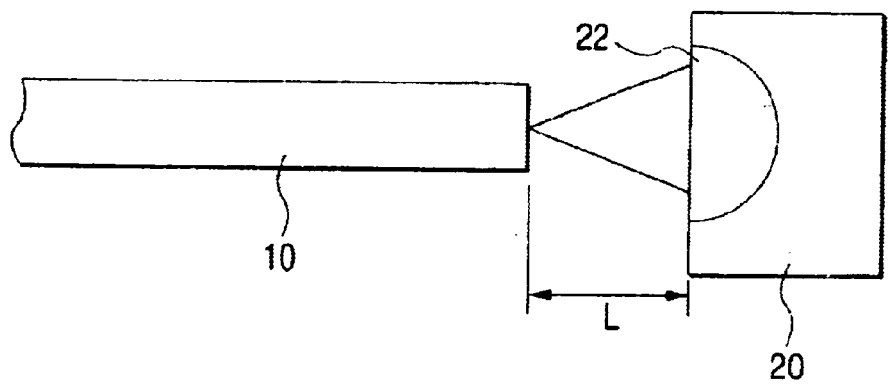
FIGS. 8A and 8B are views showing another example of the configuration of the conventional optical module.
Figure 8B:
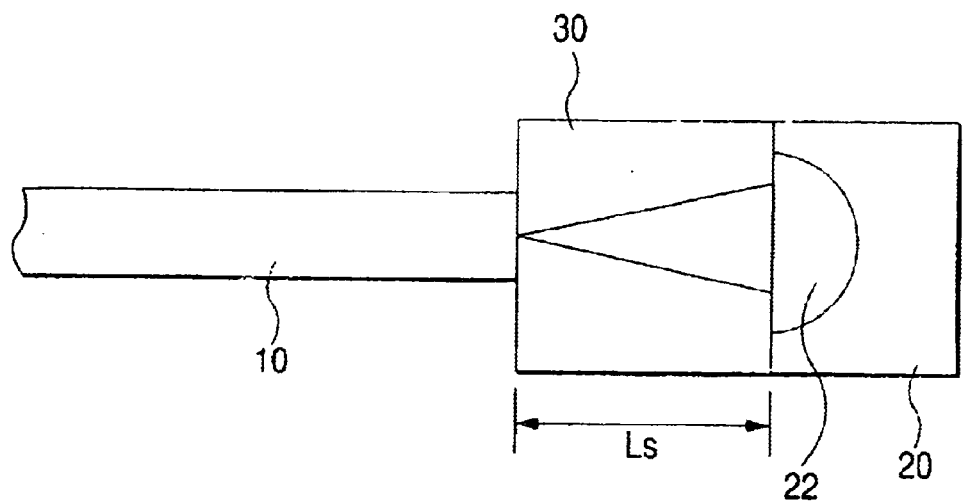

The following effect can be obtained from the above description. When the distance L between the lens 22 and the optical fiber 10 is selected to be not smaller than 1.125 mm in air as shown in FIG. 8A, light is also input to an area out of the effective area of the lens 22. Further, when the thickness Ls of the spacer 30 is selected to be not smaller than 1.63 mm in the case of the conventional configuration in which a general quartz glass substrate (without any concave portion) as the spacer 30 is put between the lens 22 and the optical fiber 10 as shown in FIG. 8B, light is also input to an area out of the effective area of the lens because the refractive index of quartz glass is 1.46.

On the other hand, in the configuration of the invention in which the flat plate-like transparent member (spacer) 40 having the spherical concave portion 42 is used as shown in FIG. 1, light is prevented from being input to an area out of the lens area even in the case where the distance La between the lens 22 and the optical fiber 10 is increased to 2 mm.

Figure 2:
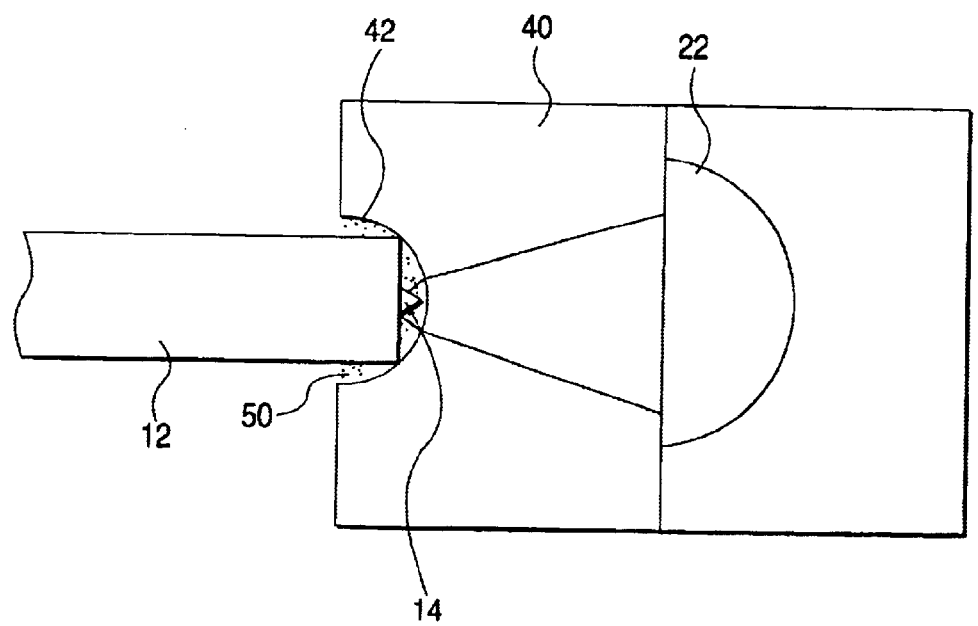
FIG. 2 is a typical view showing another embodiment of the optical module according to the invention.

When an end portion of the optical fiber is etched with a mixture solution of hydrofluoric acid and ammonium fluoride, the diameter of the optical fiber can be reduced. Accordingly, the curvature radius of the concave portion can be reduced without limit to 125 μm which is a standard of the diameter of a general single mode optical fiber. In this case, when a core tip portion 14 of the optical fiber 12 having a diameter reduced by etching is protruded as shown in FIG. 2, the core tip portion 14 is effective in attenuating reflected return light. The etching of the tip of the optical fiber is simple compared with the hemispherically ending process, so that complex steps are not required. In addition, as will be described later, the outer diameter of the tip portion of the optical fiber can be reduced, so that module design can be performed without limit to the standard of the diameter of the optical fiber.

Figure 3:
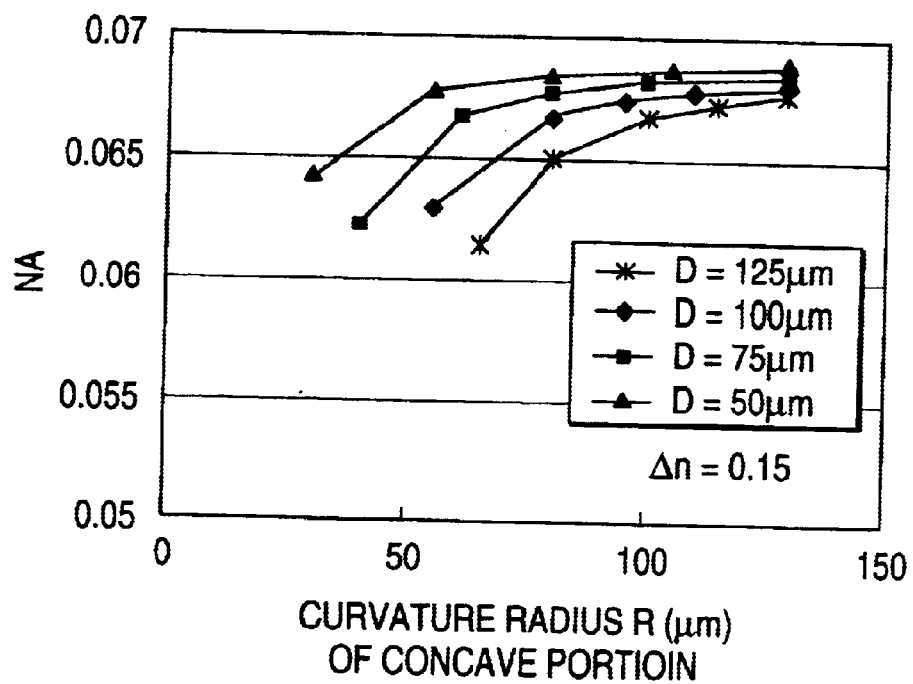
FIG. 3 is a graph showing a numerical aperture reducing effect of the optical module according to the invention.
Figure 4:
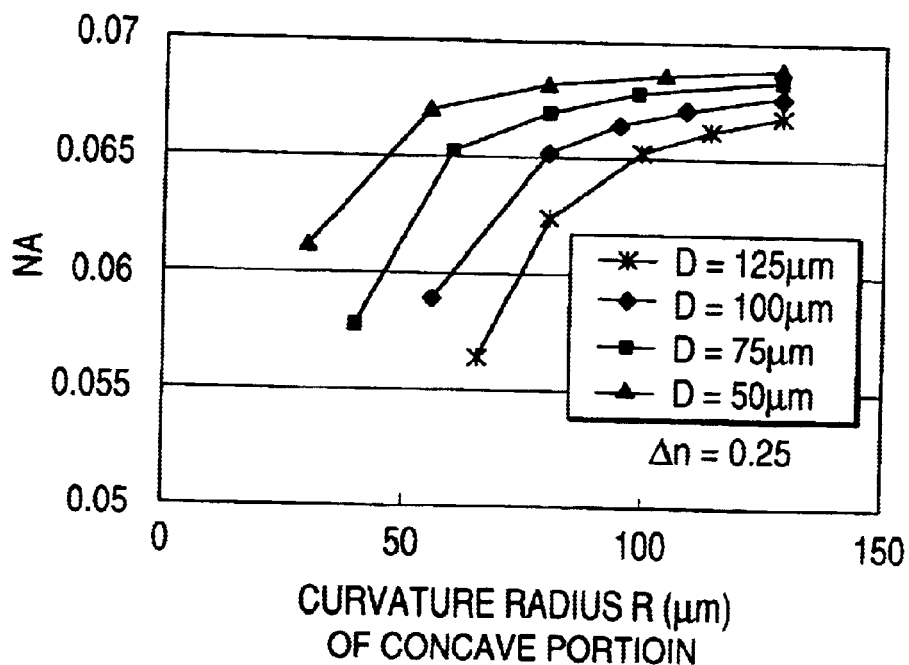
FIG. 4 is a graph showing a numerical aperture reducing effect of the optical module according to the invention.
Figure 5:
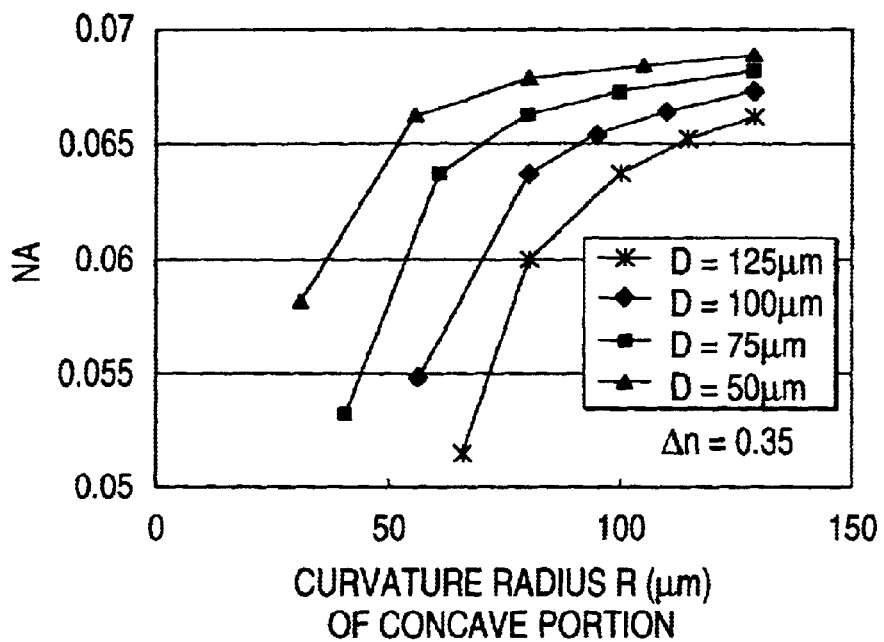
FIG. 5 is a graph showing a numerical aperture reducing effect of the optical module according to the invention.

FIG. 3 shows the relation between the curvature radius of the concave portion and NA in the case where the difference Δn between the refractive index of the flat plate-like transparent member having the concave portion and the refractive index of the filler material provided in the concave portion is selected to be 0.15. The diameter D of the optical fiber was changed in a range of from 50 μm to 125 μm. FIGS. 4 and 5 show NA in the case where Δn is changed to 0.25 and 0.35 respectively.

The following fact is found from these graphs. When the diameter of the optical fiber is constant, NA decreases as the curvature radius R of the concave portion decreases. When the curvature radius of the concave portion is constant, NA decreases as the diameter D of the optical fiber increases. It is further obvious that NA decreases as the refractive index difference Δn increases.

It can be further found from these graphs that when Δn is in a range of from 0.15 to 0.35, reduction in the curvature radius R of the concave portion to 70% or less as large as the diameter D of the optical fiber reduced by etching is effective in reducing NA regardless of Δn. Although it is preferable that R is reduced as sufficiently as possible, the allowable lower limit of R is equal to about D/2 because of the relation between R and the diameter of the concave portion which can receive the optical fiber. NA decreases as Δn increases. If Δn is smaller than 0.15, a remarkable effect cannot be expected. It is however difficult to obtain a refractive index difference larger than 0.35 when a general material is used.

If the aforementioned condition is satisfied, an optical module using an array of lenses arranged at intervals of a pitch shorter than the diameter 125 μm of the standard optical fiber can be achieved with high coupling efficiency and low crosstalk. From the point of view of mechanical strength of the optical fiber, the diameter of the optical fiber allowed to be applied to the optical module according to the invention is limited to about 50 μm.

The planar lens array or the flat plate-like transparent member having the concave portions has a tendency to reflect light when the light is incident perpendicularly onto a surface of the planar lens array or the flat plate-like transparent member. Accordingly, there is fear that reflected return light undesirable for optical communication may increase. It is however easy to take measures to provide an anti-reflection film on the surface of each of these members because these members are flat.

Although the embodiment has been described upon the case where a single mode optical fiber is used by way of example, the invention may be also applied to the case where an optical fiber having a large numerical aperture such as a gradient index multi-mode optical fiber is used as the optical fiber. Also in this case, the effect of the invention in increase of coupling efficiency and reduction of crosstalk due to reduction of the numerical aperture can be obtained likewise.

A vapor phase method such as dry etching may be used as the method for producing each concave portion. Because the portion requiring the lens effect is a portion in front of the position on which the optical fiber abuts, that is, a portion of a space closed between the optical fiber and the concave portion, there is no problem if the inner surface of the concave portion in this portion is a curved surface having a predetermined curvature radius. Accordingly, it is unnecessary to take particular care of the shape of the inner surface of the concave portion on the outside of the position on which the optical fiber abuts if insertion of the optical fiber is not disturbed.

An organic-inorganic composite material such as a sol-gel material as well as a resin such as an optical adhesive agent can be used as the filler material provided in the concave portion. It is however necessary that the filler material has high transparency to propagated light and fluidity at the time of filling and is hardened by heating or light irradiation after filling to thereby exhibit an effect of fixing the optical fiber. The refractive index of the filler material needs to be selected to be in a range allowed to generate the lens effect but need not be uniform.

Figure 6:
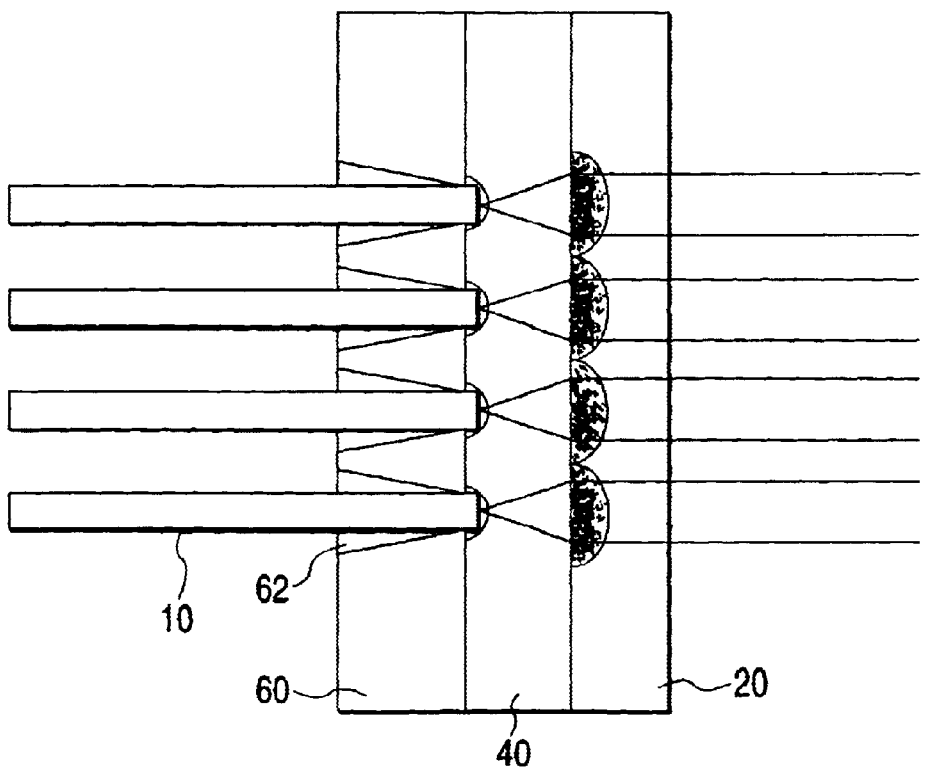
FIG. 6 is a typical view showing an example of the form in use of the optical module according to the invention.
Figure 7A:
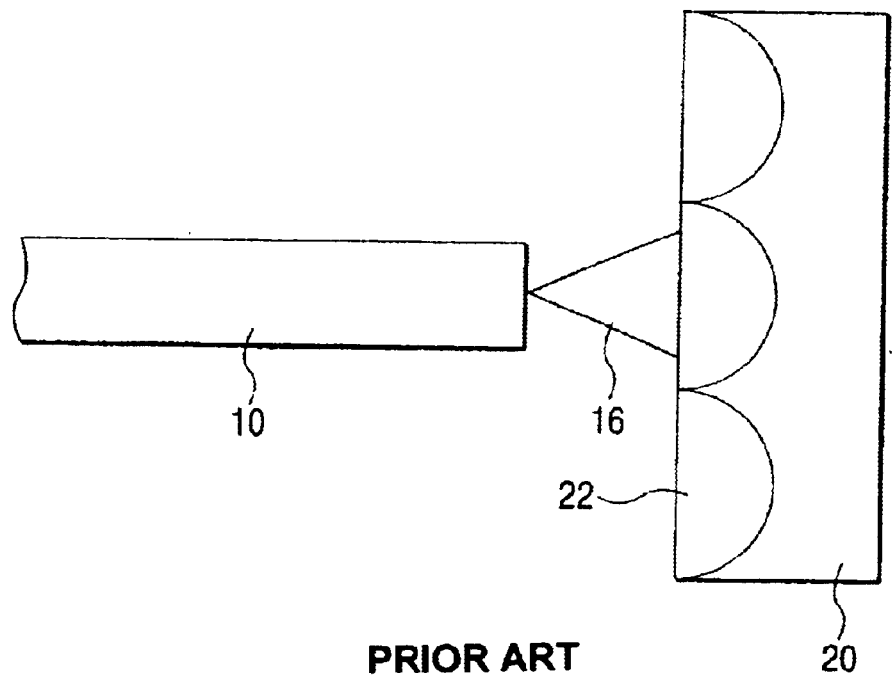
FIGS. 7A and 7B are views showing an example of the configuration of a conventional optical module.
Figure 7B:
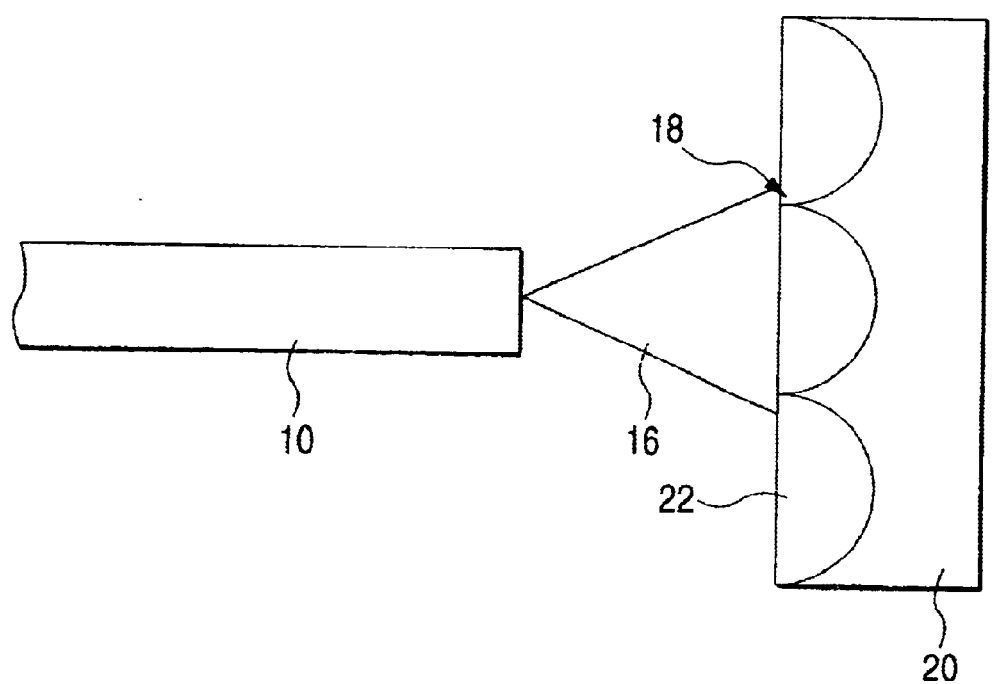

Incidentally, a member 60 having through-holes 62 as shown in FIG. 6 may be used so as to be stuck onto the flat plate-like transparent member 40 in order to support the optical fibers. If the through-holes 62 are aligned with the spherical concave portions 42 respectively in advance, the through-holes 62 serve as guides to make it easy to insert the optical fibers 10 in the concave portions 42 respectively.

In the invention, a spherical concave portion is provided in a transparent member that will be inserted between an optical fiber and a lens. The optical fiber is inserted in the concave portion so as to abut thereon. In this state, the concave portion is filled with a high-refractive-index material to thereby generate a lens effect in a tip of the optical fiber; As a result, the numerical aperture with respect to light output from the optical fiber is reduced, so that both high coupling efficiency and low crosstalk can be attained in an optical module having an optical fiber-lens coupling function. The lens effect can be diversified according to the refractive index of the filler material, the shape of the concave portion and the size of the optical fiber. For example, a small-size optical module can be provided because high coupling efficiency can be obtained even in the case where the diameter of the lens used is small.

In addition, according to the configuration, alignment of the optical fiber with the lens can be facilitated as well as processing a tip of the optical fiber into a hemispherical tip can be simplified.

In the description of the above embodiment, a planar lens (including a lens array) is joined to the transparent member. However, the invention is not limited to this configuration. A structure where a fiber is fixed in the spherical concave portion of the transparent member as disclosed in the present application can be applied to various applications as a single optical module when it is combined with other optical elements.

What is claimed is:

1. An optical module comprising:
   an optical fiber;
   a planar lens; and
   a transparent member having a nearly spherical concave portion formed on a first surface thereof;
   wherein an end surface of said optical fiber is fixed in said concave portion of said transparent member so as to abut thereon; and
   said planar lens is joined to a second surface of said transparent member opposite to said first surface so that an optical axis of said optical fiber is coincident with an optical axis of said planar lens whereby said optical fiber and said planar lens are optically coupling to each other.

2. An optical module according to claim 1, wherein said optical fiber is processed so that a tip portion of a core of said optical fiber is protruded from a clad of said optical fiber.

3. An optical module according to claim 1, further comprising a filler material having a refractive index higher than a refractive index of said transparent member, wherein said concave portion formed in said transparent member is filled with said filler material to thereby fix said optical fiber.

4. An optical module according to claim 3, wherein a difference between a refractive index of said filler material provided in said concave portion and a refractive index of said transparent member is in a range of from 0.15 to 0.35 at a wavelength used.

5. An optical module according to claim 4, wherein a ratio of a curvature radius of one of said concave portions to a diameter of said optical fiber at a portion closed by the corresponding optical fiber abutting on said concave portion is in a range of from 0.5 to 0.7.

6. An optical module comprising:

a plurality of optical fibers;

a planar lens array having a plurality of lens elements arranged therein; and a transparent member on a first surface of which a plurality of nearly spherical concave portions are formed so as to correspond to an arrangement of said lens elements;

wherein end portions of said optical fibers are fixed in said concave portions of said transparent member so as to abut thereon respectively; and said planar lens array is joined to a second surface of said transparent member opposite to said first surface so that optical axes of said optical fibers are coincident with optical axes of said lens elements of said planar lens array respectively, whereby said plurality of optical fibers and said plurality of lens elements are optically coupled to each other respectively.

7. An optical module according to claim 6, wherein each optical fiber is processed so that a tip portion of a core of said optical fiber is protruded from a clad of said optical fiber.

8. An optical module according to claim 6, further comprising a filler material having a refractive index higher than a refractive index of said transparent member, wherein each concave portion formed in said transparent member is filled with said filler material to thereby fix said optical fiber.

9. An optical module according to claim 8, wherein a difference between the refractive index of said filler material provided in each concave portion and the refractive index of said transparent member is in a range of from 0.15 to 0.35 at a wavelength used.

10. An optical module according to claim 9, wherein a ratio of a curvature radius of one of said concave portions to a diameter of said optical fiber at a portion closed by the corresponding optical fiber abutting on said concave portion is in a range of from 0.5 to 0.7.

11. An optical module according to claim 6, wherein a distance between optical axes of adjacent ones of said lens elements is in a range of from 50 µm to 125 µm.

12. An optical module comprising:

an optical fiber;

a transparent member having a nearly spherical concave portion formed on a first surface thereof;

wherein an end surface of said optical fiber is fixed in said concave portion of said transparent member so as to abut thereon.

13. An optical module according to claim 12, wherein said optical fiber is processed so that a tip portion of a core of said optical fiber is protruded from a clad of said optical fiber.

14. An optical module according to claim 12, further comprising a filler material having a refractive index higher than a refractive index of said transparent member, wherein said concave portion formed in said transparent member is filled with said filler material to thereby fix said optical fiber.

15. An optical module according to claim 14, wherein a difference between a refractive index of said filler material provided in said concave portion and a refractive index of said transparent member is in a range of from 0.15 to 0.35 at a wavelength used.

16. An optical module according to claim 15, wherein a ratio of a curvature radius of one of said concave portions to a diameter of said optical fiber at a portion closed by the corresponding optical fiber abutting on said concave portion is in a range of from 0.5 to 0.7.

17. An optical module according to claim 12, wherein a plurality of optical fibers are fixed in a plurality of nearly spherical concave portions formed on said first surface of said transparent member, respectively.

* * * * *